United States Patent
Wu

(10) Patent No.: US 11,894,671 B2
(45) Date of Patent: Feb. 6, 2024

(54) ELECTRICAL OVER STRESS PROTECTION DEVICE

(71) Applicant: NANYA TECHNOLOGY CORPORATION, New Taipei (TW)

(72) Inventor: Chang-Ting Wu, Hsinchu County (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 92 days.

(21) Appl. No.: 17/838,282

(22) Filed: Jun. 13, 2022

(65) Prior Publication Data

US 2023/0402834 A1    Dec. 14, 2023

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
CPC ................................ H02H 1/0007; H02H 3/20
See application file for complete search history.

(56) References Cited

U.S. PATENT DOCUMENTS

| | | | |
|---|---|---|---|
| 5,631,793 A * | 5/1997 | Ker | H01L 27/0251 361/111 |
| 11,569,657 B1 * | 1/2023 | Huang | H02H 1/0007 |
| 2005/0057866 A1 * | 3/2005 | Mergens | H03K 17/305 361/56 |
| 2012/0243133 A1 * | 9/2012 | Wu | H02H 9/046 361/56 |
| 2023/0009740 A1 * | 1/2023 | Hung | H02H 9/046 |

FOREIGN PATENT DOCUMENTS

| TW | 200541043 | 12/2005 |
|---|---|---|
| TW | 201240066 | 10/2012 |
| TW | 201904158 | 1/2019 |

OTHER PUBLICATIONS

"Office Action of Taiwan Counterpart Application", dated Aug. 1, 2023, p. 1-p. 5.

* cited by examiner

*Primary Examiner* — Jared Fureman
*Assistant Examiner* — Nicolas Bellido
(74) *Attorney, Agent, or Firm* — JCIPRNET

(57) ABSTRACT

An electrical over stress protection device is provided. A detection circuit detects an input voltage from a pad, provides a first discharge path when the input voltage is higher than a preset voltage, and provides a turn-on voltage to a discharge protection circuit to control the discharge protection circuit to provide at least one second discharge path.

10 Claims, 4 Drawing Sheets

ELECTRICAL OVER STRESS PROTECTION DEVICE

BACKGROUND

Technical Field

The disclosure relates to a protection device, and more particularly to an electrical over stress protection device.

Description of Related Art

Electrical over stress (EOS) events may generate high electric fields and cause circuits to temporarily or permanently lose functions. EOS events may be caused by, for example, electromagnetic pulses, electrostatic discharges, lightning, etc. or induced by the operation of other electronic elements.

Generally, for EOS events, a circuit disposed outside a chip is usually relied on to avoid the occurrence of EOS events. However, when the protection of the circuit outside the chip is insufficient, or a relevant protection circuit is not disposed outside the chip, protection can only rely on a circuit inside the chip itself.

SUMMARY

The disclosure provides an electrical over stress (EOS) protection device, which may detect and discharge a voltage or a current for an EOS event, so as to avoid damage to internal elements of a chip.

The EOS protection device of the disclosure is configured to protect an internal circuit of the chip. The internal circuit receives an input voltage through a pad. The EOS protection device includes a first protection resistor circuit, a detection circuit, a voltage divider circuit, and a discharge protection circuit. The first protection resistor circuit is coupled to the pad of the chip. The detection circuit is coupled to the first protection resistor circuit, detects the input voltage, and provides a turn-on voltage when the input voltage is higher than a preset voltage. The voltage divider circuit is coupled to the detection circuit and a ground terminal. The first protection resistor circuit, the detection circuit, and the voltage divider circuit form a first discharge path when the input voltage is higher than the preset voltage. The discharge protection circuit is coupled to the pad, the detection circuit, and the ground terminal, and provides at least one second discharge path according to the turn-on voltage.

In an embodiment of the disclosure, the above-mentioned detection circuit includes a transistor. The first terminal and the second terminal of the transistor are coupled to the first protection resistor circuit and the voltage divider circuit, respectively, and the control terminal of the transistor is coupled to a control voltage. The transistor is turned on when the input voltage is higher than the preset voltage.

In an embodiment of the disclosure, the above-mentioned discharge protection circuit includes a second protection resistor circuit, a switch circuit, and a third protection resistor circuit. The second protection resistor circuit is coupled to the pad of the chip. The switch circuit is coupled to the second protection resistor circuit and the detection circuit. The third protection resistor circuit is coupled between the switch circuit and the ground terminal. The switch circuit is turned on under the control of the turn-on voltage to provide a second discharge path.

In an embodiment of the disclosure, the above-mentioned switch circuit includes a transistor. The transistor is coupled between the second protection resistor circuit and the third protection resistor circuit, and the control terminal of the transistor is coupled to the detection circuit. The transistor is turned on under the control of the turn-on voltage to provide the second discharge path.

In an embodiment of the disclosure, the above-mentioned discharge protection circuit includes a second protection resistor circuit, multiple switch circuits, and multiple third protection resistor circuits. The second protection resistor circuit is coupled to the pad of the chip. The multiple switch circuits are coupled to the second protection resistor circuit and the detection circuit. The third protection resistor circuits are coupled between the corresponding switch circuits and the ground terminal, respectively, and the multiple switch circuits are turned on under the control of the turn-on voltage to provide multiple second discharge paths.

In an embodiment of the disclosure, each of the switch circuits includes a transistor, each of the transistors is coupled between the second protection resistor circuit and the corresponding third protection resistor circuits, respectively, and the control terminal of each of the transistors is coupled to the detection circuit. Each of the transistors is turned on under the control of the turn-on voltage to provide the second discharge paths.

In an embodiment of the disclosure, the above-mentioned transistors have different threshold voltages.

In an embodiment of the disclosure, the above-mentioned voltage divider circuit divides the turn-on voltage to generate at least one divided voltage. The discharge protection circuit includes a second protection resistor circuit, multiple switch circuits, and multiple third protection resistor circuits. The second protection resistor circuit is coupled to the pad of the chip. The switch circuits are coupled to the second protection resistor circuit, the detection circuit, and the voltage divider circuit. The third protection resistor circuits are coupled between the corresponding switch circuits and the ground terminal, respectively, and each of the switch circuits is turned on under the control of the turn-on voltage or the corresponding divided voltage to provide multiple second discharge paths.

In an embodiment of the disclosure, each of the switch circuits includes a transistor. Each of the transistors is coupled between the second protection resistor circuit and the corresponding third protection resistor circuits, respectively, and the control terminal of each of the transistors is coupled to the detection circuit or the corresponding divided voltage. Each of the transistors is turned on under the control of the turn-on voltage or the corresponding divided voltage to provide the second discharge paths.

In an embodiment of the disclosure, the above-mentioned control voltage is a system power voltage.

Based on the above, the detection circuit of the embodiment of the disclosure may detect the input voltage, provide the first discharge path when the input voltage is higher than the preset voltage, and provide the turn-on voltage to the discharge protection circuit to control the discharge protection circuit to provide the second discharge path. In this way, when an EOS event occurs, the excessive voltage or current may be quickly discharged through the first discharge path and the second discharge path, so as to avoid damage to the internal circuit.

In order to make the aforementioned features and advantages of the disclosure comprehensible, embodiments accompanied with drawings are described in detail below.

DESCRIPTION OF THE EMBODIMENTS

Figure 1:
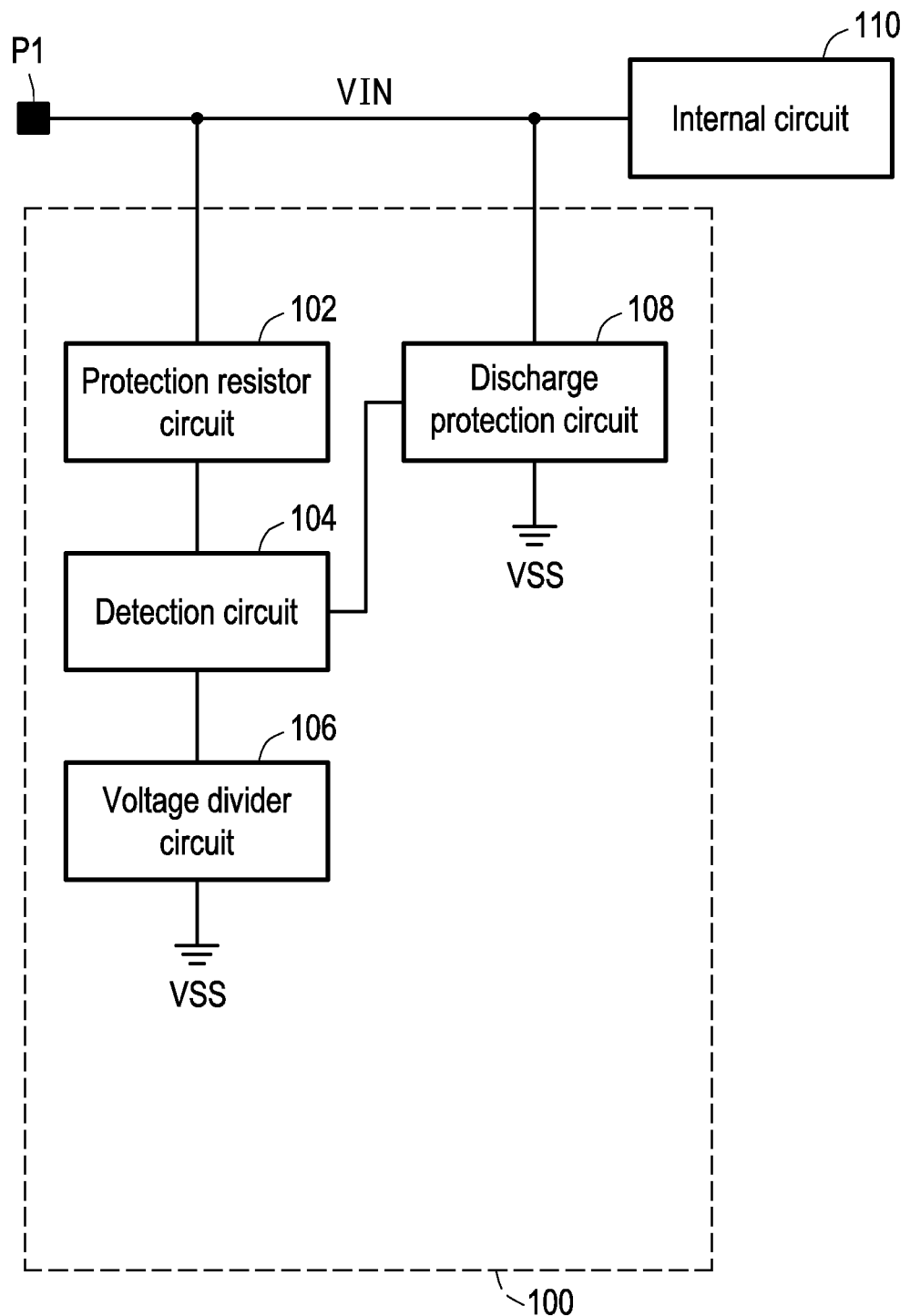
FIG. 1 is a schematic diagram of an electrical over stress (EOS) protection device according to an embodiment of the disclosure.

FIG. 1 is a schematic diagram of an electrical over stress (EOS) protection device according to an embodiment of the disclosure. Please refer to FIG. 1. An EOS protection device 100 is disposed inside a chip to protect an internal circuit 110 of the chip, and the internal circuit 110 of the chip may receive an input voltage VIN through a pad P1. The EOS protection device 100 may include a protection resistor circuit 102, a detection circuit 104, a voltage divider circuit 106, and a discharge protection circuit 108. The protection resistor circuit 102 is coupled to the pad P1 of the chip and the detection circuit 104. The detection circuit 104 is coupled to the voltage divider circuit 106 and the discharge protection circuit 108. The voltage divider circuit 106 is further coupled to a ground terminal VSS. In addition, the discharge protection circuit 108 is coupled to the pad P1 and the ground terminal VSS.

The detection circuit 104 may detect the input voltage VIN, and provides a first discharge path when the input voltage VIN is higher than a preset voltage, that is, when an EOS event occurs, to discharge an excessive voltage or current from the pad P1. Further, the first discharge path may be formed by the protection resistor circuit 102, the detection circuit 104, and the voltage divider circuit 106, and provide a discharge path from the pad P1 to the ground terminal VSS. Meanwhile, the detection circuit 104 may further provide a turn-on voltage to the discharge protection circuit 108 to control the discharge protection circuit 108 to provide a second discharge path from the pad P1 to the ground terminal VSS.

In this way, the detection circuit 104 detects the input voltage VIN to provide the first discharge path, and controls the discharge protection circuit 108 to provide the second discharge path. Therefore, the occurrence of the EOS event may be quickly responded since the excessive voltage or current from the pad P1 may be discharged through the first discharge path and the second discharge path, thereby effectively preventing the internal circuit 110 from being damaged.

Figure 2:
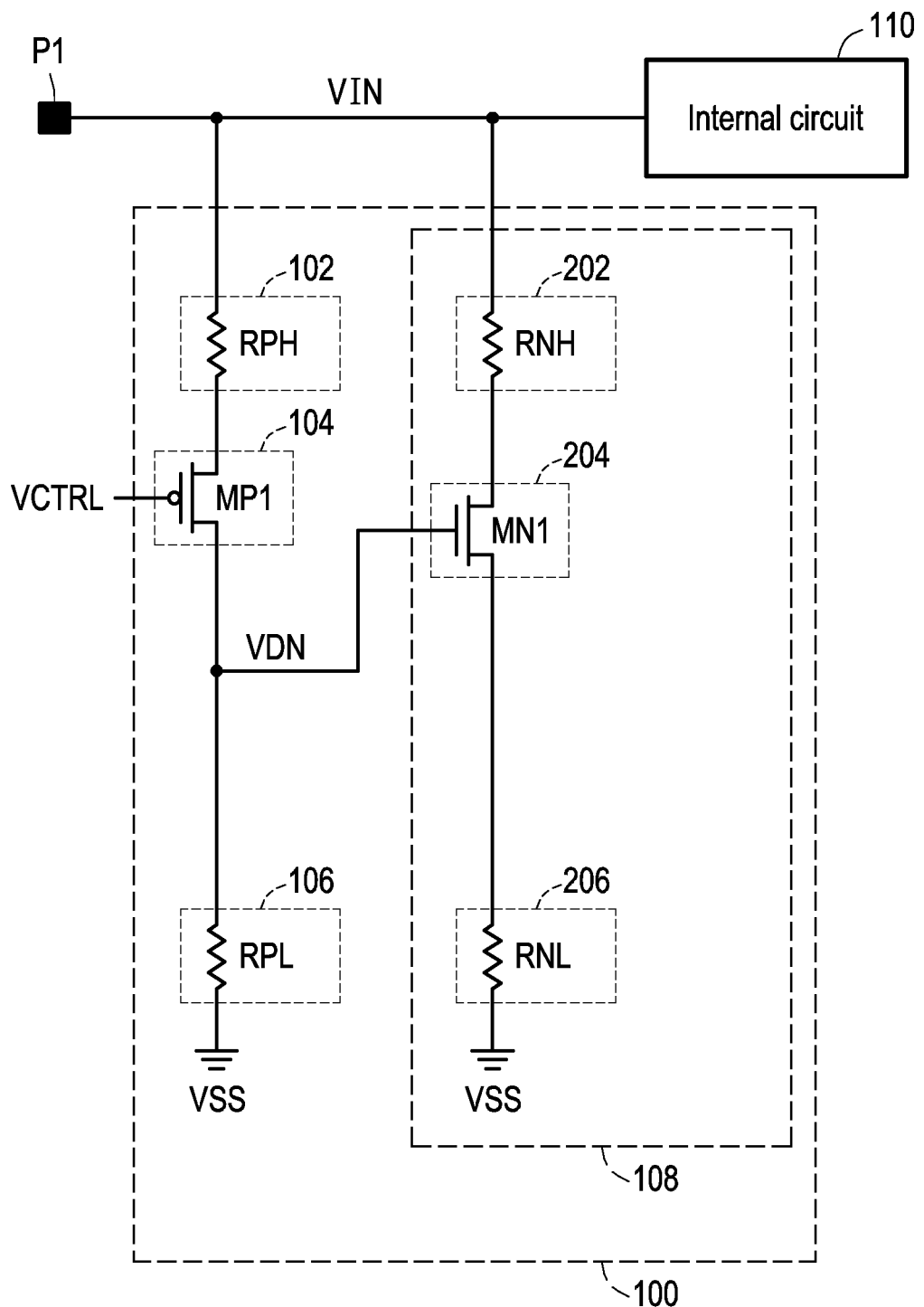
FIG. 2 is a schematic diagram of an EOS protection device according to another embodiment of the disclosure.

FIG. 2 is a schematic diagram of an EOS protection device according to another embodiment of the disclosure. Further, the protection resistor circuit 102, the detection circuit 104, and the voltage divider circuit 106 in the embodiment of FIG. 1 may be implemented by a resistor RPH, a transistor MP1, and a resistor RPL, respectively, in the embodiment. The resistor RPH is coupled between the pad P1 and the first terminal of the transistor MP1, the resistor RPL is coupled between the second terminal of the transistor MP1 and the ground terminal VSS, and the control terminal of the transistor MP1 is coupled to a control voltage VCTRL. In addition, the discharge protection circuit 108 of the embodiment may include a protection resistor circuit 202, a switch circuit 204, and a protection resistor circuit 206. The protection resistor circuit 202, the switch circuit 204, and the protection resistor circuit 206 may be implemented by, for example, a resistor RNH, a transistor MN1, and a resistor RNL, respectively. The resistor RNH, the transistor MN1, and the resistor RNL are connected in series between the pad P1 and the ground terminal VSS. The control terminal of the transistor MN1 is coupled to the second terminal of the transistor MP1. The ground terminal VSS may be, for example, a ground layer connected to the outside of the chip, such as a ground layer of a printed circuit board or a metal plate, etc., but is not limited thereto.

The transistor MP1 may be configured to detect whether a surge signal occurs in the input voltage VIN. For example, when the voltage value of the first terminal of the transistor MP1 is higher than the sum of the control voltage VCTRL and the threshold voltage of the transistor MP1, the transistor MP1 is to be turned on. Such a situation indicates that at this time, the voltage value of the input voltage VIN is higher than the preset voltage. Moreover, the voltage value of the control voltage VCTRL may be set to, for example, a system power voltage (maximum voltage of the system) of the chip, but is not limited thereto. In other embodiments, the control voltage VCTRL can also be set to any other voltage from 0 to the system power supply voltage, for example. When the transistor MP1 is to be turned on, the transistor MP1 may provide a turn-on voltage VDN to the transistor MN1 at the second terminal of the transistor MP1. The transistor MP1, the resistor RPH, and the resistor RPL that are turned on at the same time may form the first discharge path, and discharge the surge signal to the ground terminal VSS. In addition, the transistor MN1 may be turned on under the control of the turn-on voltage VDN, and forms the second discharge path with the resistors RNH and RNL, so as to further quickly discharge the surge signal to the ground terminal VSS.

The resistors RPH and RPL may limit the current flowing through the first discharge path, so as to avoid damage to the transistor MP1 due to the excessive current flowing through the transistor MP1. Similarly, the resistors RNH and RNL may limit the current flowing through the second discharge path, so as to avoid damage to the transistor MN1 due to the excessive current flowing through the transistor MN1. The resistance values of the resistors RPH and RNH may be, for example, several hundreds of ohms, and the resistance values of the resistors RPL and RNL may be, for example, several tens of ohms, but are not limited thereto. A user may design the resistance values of the resistors RPH, RNH, RPL, and RNL according to an actual situation. In addition, the protection resistor circuit and the voltage divider circuit in the above-mentioned embodiment are implemented by a single resistor, but are not limited thereto. In other embodiments, the protection resistor circuit and the voltage divider circuit may also be composed of, for example, multiple resistors connected in parallel or in series.

Figure 3:
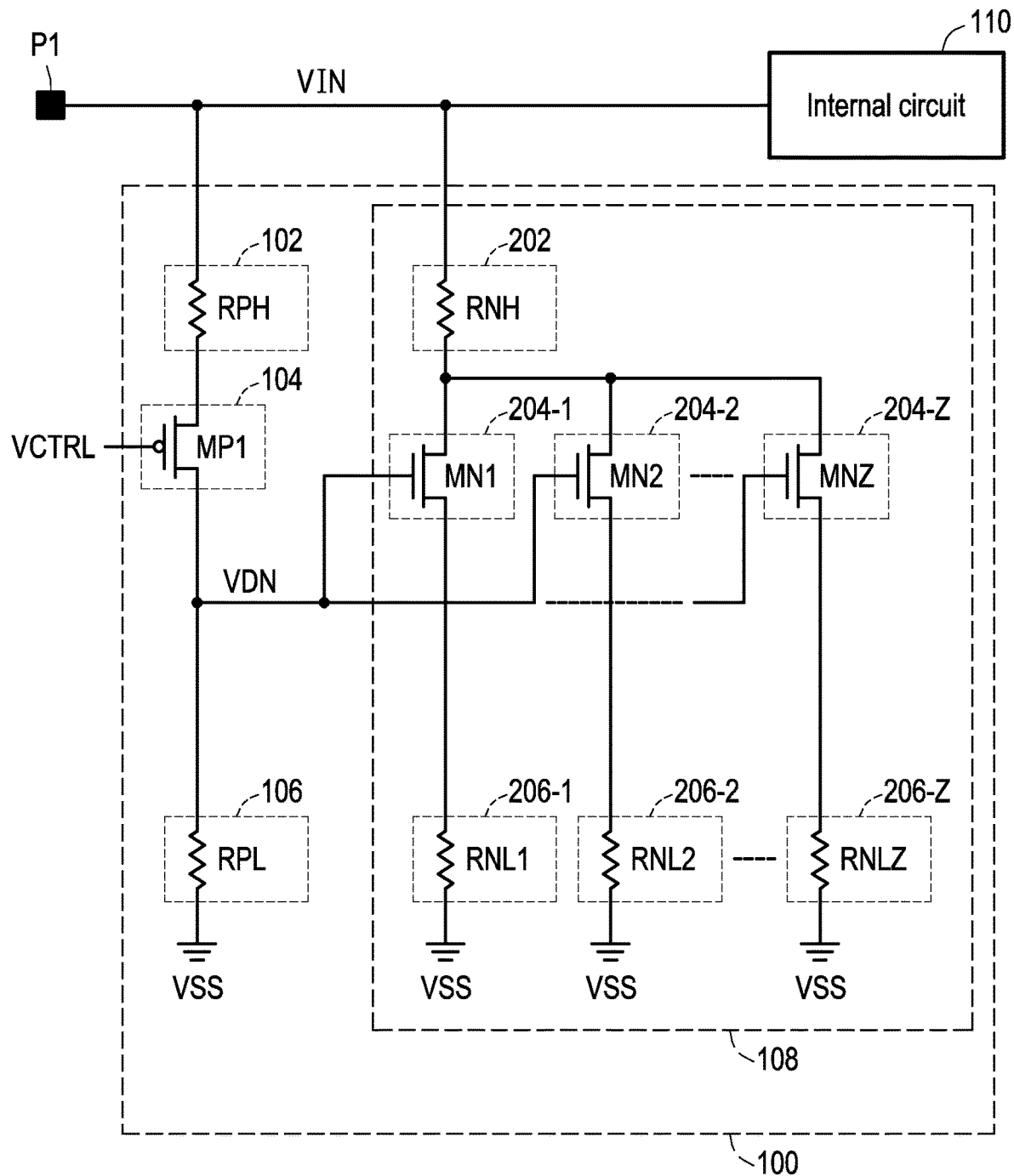
FIG. 3 is a schematic diagram of an EOS protection device according to another embodiment of the disclosure.

FIG. 3 is a schematic diagram of an EOS protection device according to another embodiment of the disclosure. The difference between the embodiment and the embodiment of FIG. 2 is that the discharge protection circuit 108 of the embodiment may include multiple switch circuits 204-1 to 204-Z and multiple protection resistor circuits 206-1 to 206-Z, and Z is a positive integer. Each of the switch circuits 204-1 to 204-Z and the corresponding protection resistor circuits 206-1 to 206-Z are connected in series between the protection resistor circuit 202 and the ground terminal VSS. The switch circuits 204-1 to 204-Z may be implemented by, for example, transistors MN1 to MNZ, and the protection resistor circuits 206-1 to 206-Z may be implemented by, for example, resistors RNL1 to RNLZ, but are not limited thereto. The number and size of the transistors MN1 to MNZ can be designed according to the needs, for example, the sizes of the transistors MN1 to MNZ can be made equal, or sequentially increased by multiples of 2.

When the voltage value of the first terminal of the transistor MP1 is higher than the sum of the control voltage VCTRL and the threshold voltage of the transistor MP1, that is, when the voltage value of the input voltage VIN is higher than the preset voltage, the transistor MP1 is turned on, so that the turn-on voltage VDN may be simultaneously provided to the control terminals of the transistors MN1 to MNZ to turn on the transistors MN1 to MNZ at the same time. The transistors MN1 to MNZ that have been turned on may form multiple second discharge paths with the resistor RNH and the corresponding resistors RNL1 to RNLZ, respectively, thereby greatly improving the capability of the EOS protection device to discharge the surge signal. In some embodiments, the transistors MN1 to MNZ may further be designed to have different threshold voltages, so that the EOS protection device may correspond to surge signals with different voltage values, and provide different numbers of the second discharge paths, thereby enabling the EOS protection device to discharge the surge signal at an appropriate speed to prevent an excessive discharge current from damaging elements on the discharge path.

Figure 4:
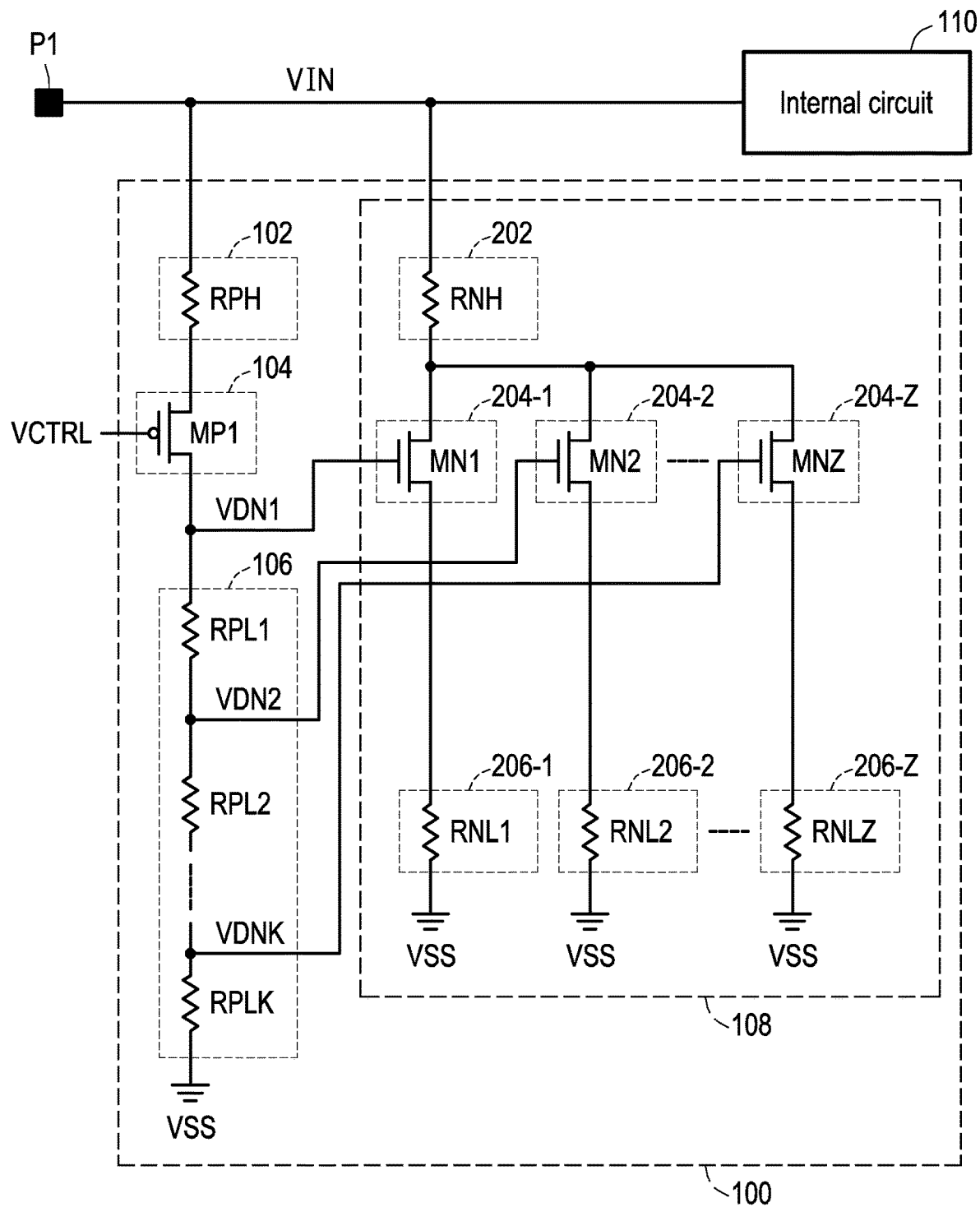
FIG. 4 is a schematic diagram of an EOS protection device according to another embodiment of the disclosure.

FIG. 4 is a schematic diagram of an EOS protection device according to another embodiment of the disclosure. The difference between the embodiment and the embodiment of FIG. 3 is that the voltage divider circuit 106 of the embodiment includes multiple resistors RPL1 to RPLK connected in series between the transistor MP1 and the ground terminal VSS, and K is an integer greater than 1. The resistors RPL1 to RPLK may divide the turn-on voltage VDN1 to generate divided voltages VDN2 to VDNK. The turn-on voltage VDN1 and the divided voltages VDN2 to VDNK may be provided to the transistors MN1 to MNZ to control the transistors MN1 to MNZ to provide the second discharge path. It is worth noting that K may be less than or equal to Z, that is, the turn-on voltage VDN1 and each of the divided voltages VDN2 to VDNK are not limited to be provided to only one corresponding transistor, and a single turn-on voltage VDN1 or divided voltage may be provided to multiple transistors. For example, the divided voltage VDN2 may be provided to the transistors MN2 and MN3, so that the transistors MN2 and MN3 respectively provide corresponding second discharge paths.

Since the voltage value of the turn-on voltage VDN1 and the voltage values of divided voltages VDN2 to VDNK are different, in the case that the transistors MN1 to MNZ have the same threshold voltage, when the voltage value of the surge signal appearing on the input voltage VIN is higher, the number of transistors MN1 to MNZ that may be turned on also increases. That is, the number of the second discharge paths is controlled by the divided voltages VDN2 to VDNK obtained by dividing the turn-on voltage VDN1 by the voltage divider circuit 106, and the EOS protection device may also be enabled to discharge the surge signal at an appropriate speed to prevent the excessive discharge current from damaging the elements on the discharge path. In addition, in some embodiments, the transistors MN1 to MNZ may also have different threshold voltages, which are not limited to the embodiment.

In summary, the detection circuit of the embodiment of the disclosure may detect the input voltage, provide the first discharge path when the input voltage is higher than the preset voltage, and provide the turn-on voltage to the discharge protection circuit to control the discharge protection circuit to provide the second discharge path. In this way, when an EOS event occurs, the excessive voltage or current may be quickly discharged through the first discharge path and the second discharge path, so as to effectively prevent the internal circuit from being damaged.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. An electrical over stress (EOS) protection device, configured to protect an internal circuit of a chip, and the internal circuit receiving an input voltage through a pad, the EOS protection device, comprising:
    a first protection resistor circuit, coupled to the pad of the chip;
    a detection circuit, coupled to the first protection resistor circuit, detecting the input voltage, and providing a turn-on voltage when the input voltage is higher than a preset voltage;
    a voltage divider circuit, coupled to the detection circuit and a ground terminal, and the first protection resistor circuit, the detection circuit, and the voltage divider circuit forming a first discharge path when the input voltage is higher than the preset voltage; and
    a discharge protection circuit, coupled to the pad, the detection circuit, and the ground terminal, and providing at least one second discharge path according to the turn-on voltage.

2. The EOS protection device according to claim 1, wherein the detection circuit comprises:
    a transistor, a first terminal and a second terminal of the transistor are coupled to the first protection resistor circuit and the voltage divider circuit, respectively, a control terminal of the transistor is coupled to a control voltage, and the transistor is turned on when the input voltage is higher than the preset voltage.

3. The EOS protection device according to claim 2, wherein the control voltage is a system power voltage.

4. The EOS protection device according to claim 1, wherein the discharge protection circuit comprises:
    a second protection resistor circuit, coupled to the pad of the chip;
    a switch circuit, coupled to the second protection resistor circuit and the detection circuit; and
    a third protection resistor circuit, coupled between the switch circuit and the ground terminal, and the switch circuit is turned on under the control of the turn-on voltage to provide the second discharge path.

5. The EOS protection device according to claim 4, wherein the switch circuit comprises a transistor, the transistor is coupled between the second protection resistor circuit and the third protection resistor circuit, a control terminal of the transistor is coupled to the detection circuit, and the transistor is turned on under the control of the turn-on voltage to provide the second discharge path.

6. The EOS protection device according to claim 1, wherein the discharge protection circuit comprises:
    a second protection resistor circuit, coupled to the pad of the chip;
    a plurality of switch circuits, coupled to the second protection resistor circuit and the detection circuit; and
    a plurality of third protection resistor circuits, coupled between corresponding switch circuits and the ground terminal, respectively, and the plurality of switch circuits are turned on under the control of the turn-on voltage to provide a plurality of second discharge paths.

7. The EOS protection device according to claim 6, wherein each of the plurality of switch circuits comprises a transistor, each of the transistors is coupled between the second protection resistor circuit and corresponding third protection resistor circuits, a control terminal of each of the transistors is coupled to the detection circuit, and each of the transistors is turned on under the control of the turn-on voltage to provide the plurality of second discharge paths.

8. The EOS protection device according to claim 7, wherein the transistors have different threshold voltages.

9. The EOS protection device according to claim 1, wherein the voltage divider circuit divides the turn-on voltage to generate at least one divided voltage, and the discharge protection circuit comprises:
   a second protection resistor circuit, coupled to the pad of the chip;
   a plurality of switch circuits, coupled to the second protection resistor circuit, the detection circuit, and the voltage divider circuit; and
   a plurality of third protection resistor circuits, coupled between corresponding switch circuits and the ground terminal, respectively, and each of the plurality of switch circuits is turned on under the control of the turn-on voltage or the corresponding divided voltage to provide a plurality of second discharge paths.

10. The EOS protection device according to claim 9, wherein each of the plurality of switch circuits comprises a transistor, each of the transistors is coupled between the second protection resistor circuit and corresponding third protection resistor circuits, respectively, a control terminal of each of the transistors is coupled to the detection circuit or the corresponding divided voltage, and each of the transistors is turned on under the control of the turn-on voltage or the corresponding divided voltage to provide the plurality of second discharge paths.

* * * * *